(No Model.)

W. E. LOVE.
HAND SEED SOWER.

No. 364,424. Patented June 7, 1887.

WITNESSES:
O. F. McArdle
C. Sedgwick

INVENTOR:
W. E. Love
BY Munn & Co.
ATTORNEYS.

UNITED STATES PATENT OFFICE.

WILLIAM E. LOVE, OF MADISON, TENNESSEE.

HAND SEED-SOWER.

SPECIFICATION forming part of Letters Patent No. 364,424, dated June 7, 1887.

Application filed February 23, 1887. Serial No. 228,554. (No model.)

*To all whom it may concern:*

Be it known that I, WILLIAM E. LOVE, of Madison, in the county of Davidson and State of Tennessee, have invented a new and Improved Hand Seed-Sower, of which the following is a full, clear, and exact description.

My invention relates to a seed-sower adapted to be carried by the operator, and has for its object to provide a sower wherein the supply of seed will not be varied or entirely cut off by sticks or straws choking the feed, and wherein the flow of seed will be stopped simultaneously with the stopping of the machine. The object of the invention is also to provide a ready and simple means of adjustment, whereby the quantity of seed to be sown may be regulated at pleasure.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
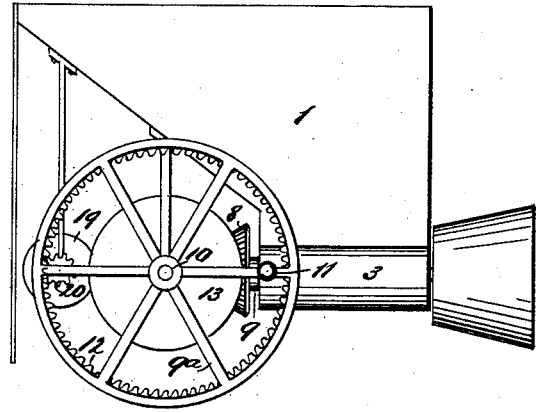
Figure 2:
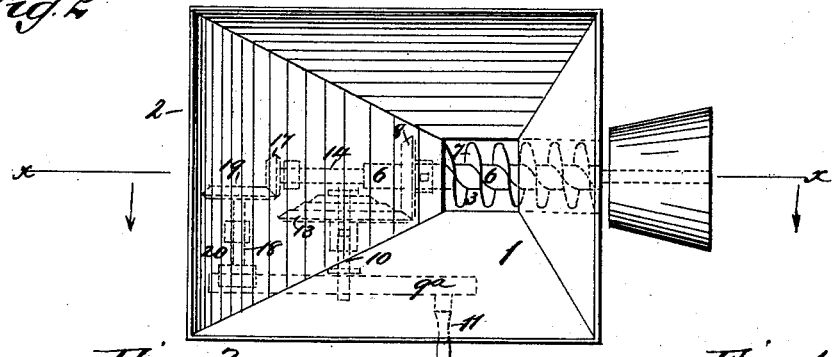
Figure 3:
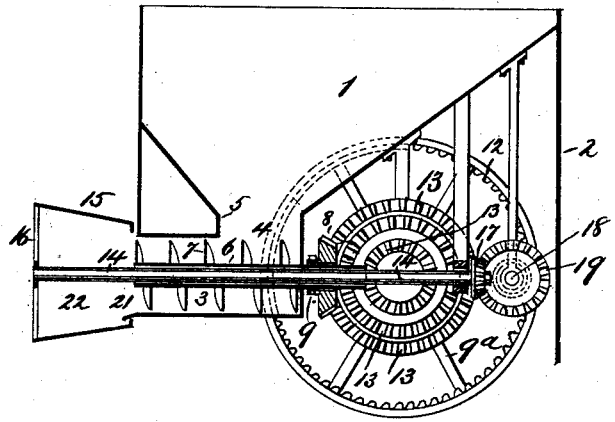
Figure 4:
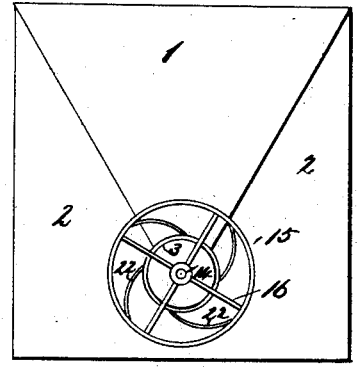

Figure 1 is a side elevation of my machine. Fig. 2 is a plan view thereof, illustrating the position of the gearing in dotted lines. Fig. 3 is a central vertical and longitudinal section, and Fig. 4 is an end view.

In carrying out the invention a large hopper, 1, is provided, which is adapted to hold seed, the upper portion of which hopper substantially constitutes the entire top of the machine.

At the top and rear end of the hopper a plate, 2, is attached, to extend vertically downward, to which plate straps may be secured, whereby the machine is suspended in front of the operator, the plate 2 bearing against the body in front, protecting the person from oil and dust.

A tubular casing, 3, held horizontally in contact with the hopper 1 at the bottom, is provided with an aperture, 4, in its upper side, at the rear, which aperture is in registry with the reduced end or outlet 5 of hopper, the said reduced end of the hopper and the casing being preferably made integral, as shown in Fig. 3.

Within the casing 3 a hollow shaft, 6, is journaled, adapted to extend flush with the outer open end of the casing and a distance beyond the rear closed end, and upon the said shaft 6, within the said casing, extending from end to end, an integral spiral feed-screw, 7, is produced. Upon the outer rear end of the hollow shaft 6 a bevel-gear, 8, having an integral sleeve, 9, is secured by a set-screw passing through the sleeve and bearing upon the shaft.

At one side of the machine, preferably to the rear of the center, a balance-wheel, 9$^a$, is keyed to a transverse shaft, 10, which wheel is provided with a hand-crank, 11, and a series of teeth, 12, integral with the inner periphery.

To the opposite end of the transverse shaft 10 a cone-gear, 13, provided with an integral sleeve, is adjustably secured by a set-screw passing through said sleeve and bearing upon the shaft, as shown in dotted lines in Fig. 2. The cone-gear 13 is adapted to mesh with the bevel-gear 8 upon the hollow shaft 6, and through the adjustment of said gears the quantity of seed to be sown is regulated, the screw conveyer 7 being given its fastest motion and the greatest amount of seed sown when the bevel-gear is made to mesh with the base of the cone, and the contrary when meshed near the apex.

A longitudinal shaft, 14, is projected through the hollow shaft 6, one end of which shaft, extending beyond the open end of the casing 3, is attached to an annular distributer, 15, by means of a spider, 16, secured to the outer edges of the said distributer. The rear end of the shaft 14, which projects beyond the cone-gear 13, is supported in suitable bearings attached to the hopper and provided with a pinion, 17, keyed thereto. A short transverse shaft, 18, is journaled near the rear of the machine, as shown in dotted lines, Fig. 2, having a bevel-gear, 19, keyed at one end, adapted to mesh with the pinion 17, and a pinion, 20, secured at the other, adapted to mesh with the teeth 12 upon the inner periphery of the hand-wheel 9$^a$, whereby rapid motion is communicated to the distributer from said hand-wheel independent of the conveyer-screw 7.

The annular distributer 15 is made to revolve immediately in front of the open end of the casing 3, the seed being guided therein by a lip, 21, integral with the casing 3, which lip projects in said distributer. The inner surface of the distributer is provided with a series of spirally-arranged blades, 22, to facilitate the scattering of the seed conveyed thereto.

The operation of the machine is as follows: The seed having been placed in the hopper and the bevel-gear 8 placed in engagement with the proper circle of teeth upon the cone-gear 13, the operator suspends the machine in front of his person, and as he walks over the field turns the hand-wheel $9^a$, which sets in motion the entire mechanism of the machine. First, through the engagement of the pinion 20 with the teeth 12 upon the hand-wheel and the bevel-gear 19, motion is communicated through the pinion 17 to the longitudinal shaft 14, which in turn imparts a rapid centrifugal motion to the distributer 15; second, as the hand-wheel is turned the cone-gear 13 is revolved, which, engaging the bevel-gear 8 upon the hollow conveyer-shaft, rotates the said shaft, causing the seed as it is fed to the screw to be conveyed continuously to the distributer.

The screw has many advantages as a feed, as there is no liability of the supply of seed being varied or entirely cut off by clogging the feed-aperture with sticks or straw that may be mingled with the seed, which is often the case when the gravity system of feeding is employed, or when the slide is used for varying the feed.

The screw not only insures an uninterrupted flow of seed to the sower while the machine is in operation, but the flow of seed is simultaneously checked with the stoppage of the operation; whereas with the slide arrangement the slides have to be closed whenever the machine is stopped.

A machine constructed as herein set forth may be carried upon a wagon or other suitable conveyance, power being supplied from one of the wheels, and the machine may be used for sowing fertilizers as well as seed.

Having thus fully described my invention, I claim as new and desire to secure by Letters Patent—

1. The combination, with a hopper and an apertured casing arranged horizontally below said hopper and in connection therewith, of a conveyer-screw mounted upon a hollow shaft journaled in said casing, a centrifugal distributer at the outer end of the casing mounted upon a longitudinal shaft passing through said hollow shaft, and means for revolving the said hollow shaft and longitudinal shaft independently, substantially as shown and described, and for the purpose herein set forth.

2. The combination, with a hopper, 1, and an apertured casing arranged horizontally below said hopper and in connection therewith, of the hollow shaft 6, journaled in said casing, a conveyer-screw, 7, integral with said shaft, a bevel-gear, 8, adjustably screwed upon said hollow shaft, and an adjustable cone-pulley, 13, attached to the shaft of the drive-wheel, substantially as shown and described, whereby the speed of the screw may be regulated, as set forth.

3. The combination, with a hopper, 1, an apertured casing arranged horizontally below said hopper and in connection therewith, a conveyer screw, 7, adapted to rotate in said casing, mounted upon a hollow shaft, 6, having a bevel-gear, 8, adjustably keyed thereto, and an adjustable cone-gear, 13, adapted to mesh with said bevel-gear and secured to the shaft of the drive-wheel, of the said drive-wheel $9^a$, provided with teeth 12, a longitudinal shaft, 14, passing through said hollow shaft, carrying a centrifugal distributer, 15, and a shaft and gearing connecting said shaft 14 with the said drive-wheel, substantially as shown and described.

WILLIAM E. LOVE.

Witnesses:
C. S. LANIER,
C. H. HARBERT.